United States Patent [19]

Carmien et al.

[11] 3,972,634

[45] Aug. 3, 1976

[54] COMBINED INSERT AND END PLUG FOR FIBERGLASS TOOL HANDLES

[75] Inventors: Joseph Allen Carmien, Beverly Hills; John R. Yuhos, Van Nuys, both of Calif.

[73] Assignee: Nupla Corporation, Sun Valley, Calif.

[22] Filed: Nov. 12, 1974

[21] Appl. No.: 523,052

Related U.S. Application Data

[63] Continuation-in-part of Ser. No. 473,723, May 28, 1974, Pat. No. 3,879,145, and a continuation-in-part of Ser. No. 473,724, May 28, 1974, Pat. No. 3,917,421.

[52] U.S. Cl. .................................. 403/13; 403/268; 145/29 B

[51] Int. Cl.[2] ....................... B25G 3/00; F16D 1/00; F16G 11/00

[58] Field of Search ................. 403/11, 25, 268, 13, 403/361, 12; 145/29 R, 29 B; 248/188, 188.3, 188.8; 264/263, 267; 156/196, 212, 227

[56] References Cited

UNITED STATES PATENTS

| | | | |
|---|---|---|---|
| 2,755,114 | 11/1956 | Becker | 403/361 |
| 2,868,602 | 1/1959 | Drezner | 248/188.8 X |
| 3,355,226 | 11/1967 | Portz | 145/29 R |
| 3,874,433 | 4/1975 | Shepherd et al. | 145/29 R |

*Primary Examiner*—Werner H. Schroeder
*Assistant Examiner*—Wayne L. Shedd
*Attorney, Agent, or Firm*—Robert C. Comstock

[57] ABSTRACT

A combined insert and end plug for aligning fiberglass tool handles for attachment to tool heads and for concealing the ends of the handles. The resilient molded plastic insert has a center portion and a plurality of integral outwardly directed legs. The insert is mounted within a tool head opening so that the legs are disposed between the handle and the walls of the opening. The insert holds the handle in proper position for attachment to the tool head. The insert has a plurality of outwardly directed resilient membranes which flex inwardly during insertion and then flex outwardly by their own resilience to combine with the center portion to form a cover for the outer end of the opening.

4 Claims, 7 Drawing Figures

COMBINED INSERT AND END PLUG FOR FIBERGLASS TOOL HANDLES

REFERENCE TO RELATED APPLICATIONS

This application is a continuation-in-part of applications Ser. Nos. 473,723 and 473,724, both filed May 28, 1974, now U.S. Pat. Nos. 3,879,145 and 3,917,421, respectively.

BACKGROUND OF THE INVENTION

1. Field of the Invention

The invention relates to a combined insert for aligning fiberglass tool handles during attachment to tools and for concealing the end of the handle and providing a finished appearance for the tool.

2. Description of the Prior Art

Handles made of wood are designed to fit into a tool eye by being driven until compressed. Because the wood is in complete contact with the sides of the eye hole, the handle is properly aligned. When a handle is attached by use of an adhesive, as a fiberglass handle must be, the portion of the handle which is inside the eye hole must be smaller than the hole size of the eye in order to allow for a glue line. This glue line space creates a need of proper handle/head alignment.

At the present time, special jigs must be used to hold the tool head and handle against movement with respect to each other during the curing of the potting adhesive. Since the potting compound requires one or more hours to dry and cure, a large number of special jigs is required, with a high financial investment in such special tooling and factory space.

Tool handle attachment with the methods and devices now in use is accordingly costly in equipment, labor, time and factory space.

Another difficulty with the present methods and equipment is that the assembled tools must be kept in their jigs during the entire curing operation. Production is accordingly limited by the number of available jigs, their space requirements, etc.

At the present time, fiberglass tool handles are mounted in tool heads with the ends of the handles exposed within the tool head opening. The handle is customarily white or some other color which contrasts with the surrounding epoxy resin or other potting compound which forms the connection between the handle and tool head. Potting, for various causes, will often sink, bubble or have a poor surface finish. The result is that the end of the tool is unsightly and must be painted or coated so that it presents a more attractive appearance to a purchaser. The painting and drying operations required add more steps to the assembly operation, which steps require added expense and materials, labor, and manufacturing time.

In our application Ser. No. 473,724, there is disclosed a resilient molded insert adapted to be disposed within a tool head opening at the time the handle is inserted. The insert has integral portions which fit between the handle and tool head opening to hold the handle and tool head in proper and stationary alignment with each other.

Because the center portion of the insert was substantially equal in its dimensions to those of the narrow end of the tool head opening, it was necessary to use with said insert an end plug in the larger outer end of the opening in order to conceal the assembly and provide a finished appearance for the tool.

Such an end plug is disclosed in our application Ser. No. 473,723, in which the potting compound which is used to hold the handle to the tool head is also used to hold the end plug within the wider end of the tool head opening. The plug thereby provided a cosmetic finish for the tool and a location for indicia such as a logo, patent information, part number, warning notice, etc.

SUMMARY OF THE INVENTION

The present invention provides a combined insert and end plug for fiberglass tool handles which incorporates all of the advantages and benefits of the insert and end plug of our previous inventions into a single unitary member which serves all of the purposes previously served by the two separate members of our previous applications.

It is accordingly the primary object of the present invention to provide such a combined insert and end plug which simplifies, expedites and reduces the part and assembly costs of attaching fiberglass tool handles.

As in the previous applications, it is an object of the invention to provide a simple resilient molded insert which is adapted to be disposed within the tool head opening at the time the handle is inserted. The insert has integral portions which fit between the handle and walls of the tool head opening to hold the handle and tool head in proper and stationary relationship with respect to each other. The insert thereby completely eliminates and replaces the cumbersome and expensive special jigs which are now required.

Another object of the invention is to provide an insert of the type described which is adapted to be inserted into the tool head opening simultaneously with the handle, being engaged and inserted by the end of the handle.

It is a further object of the invention to provide such an insert which is adapted to compensate for variations in the dimensions and tolerances of the tool head opening and/or handle.

Another object of the invention is to provide such an insert which acts to prevent lateral movement of the handle within the tool head opening in any direction and which prevents twisting movement as well.

Still another object of the invention is to provide such an insert which may be manufactured economically by a single molding operation and which is simple and rapid to insert and use.

The present invention provides an insert which also acts as an end plug which is mounted within the tool head opening at the time the connection between the handle and tool head is made. The potting compound engages the insert and end plug in such a manner that the plug portion is securely held within the end of the tool head in overlying relationship to the end of the tool handle. The plug portion provides a cosmetic finish for the tool and a location for indicia such as a logo, patent number, part number, etc.

If the end plug portion is formed in a black color, it will match the color of the surrounding epoxy resin potting compound, which is actually transparent but which appears to be black because no light is passing through it. The end of the tool accordingly provides a finished appearance without any secondary painting or coating of any kind.

A primary advantage and benefit provided by the invention is the elimination of the painting and drying operation which is now required. This results in a saving in time, labor and materials, thereby reducing the cost of manufacture of the finished product. It also provides the manufacturer with the flexibility of using alternate forms of plugs with various data or indicia molded therein.

It is another object of the invention to provide an end plug having means for compensating for minor variations in the dimensions and tolerances of the tool head opening, so that a single pre-formed insert and plug is capable of use with all tool head openings of the appropriate approximate dimensions.

The invention also comprises such other objects, advantages, and capabilities as will later more fully appear and which are inherently possessed by the invention.

While there are shown in the accompanying drawings, preferred embodiments of the invention, it should be understood that the same are susceptible of modification and change without departing from the spirit of the invention.

DESCRIPTION OF THE PREFERRED EMBODIMENTS

Figure 1:
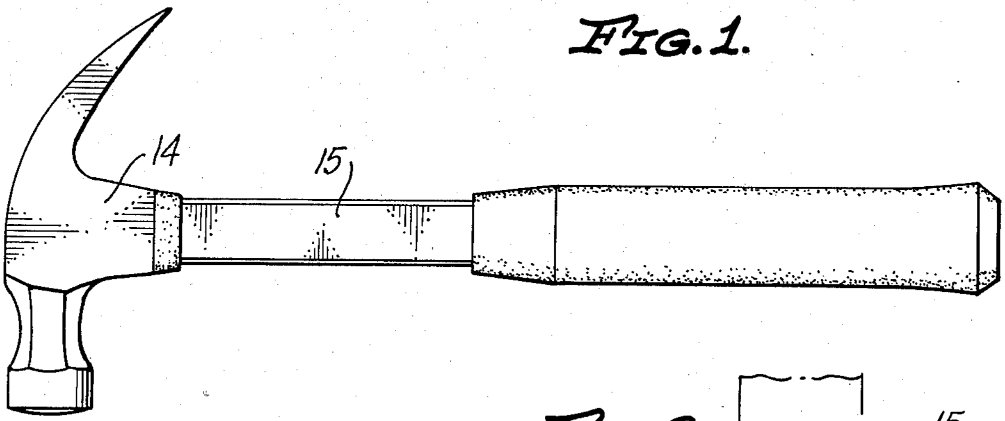
FIG. 1 is a side elevational view of a complete hammer constructed in accordance with this invention.
Figure 2:
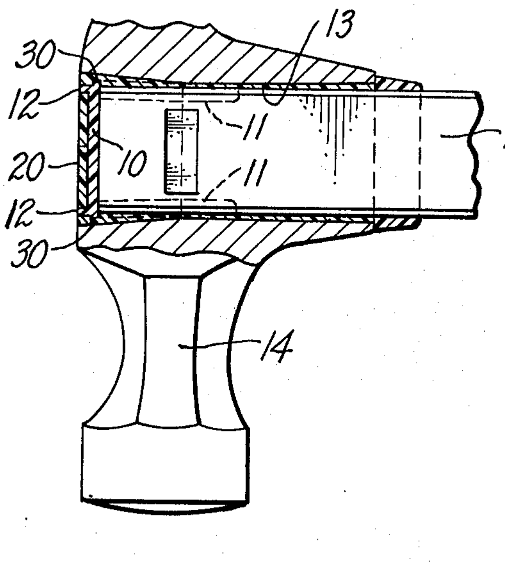
FIG. 2 is an enlarged view of the head portion thereof, partly broken away and shown in section.
Figure 3:
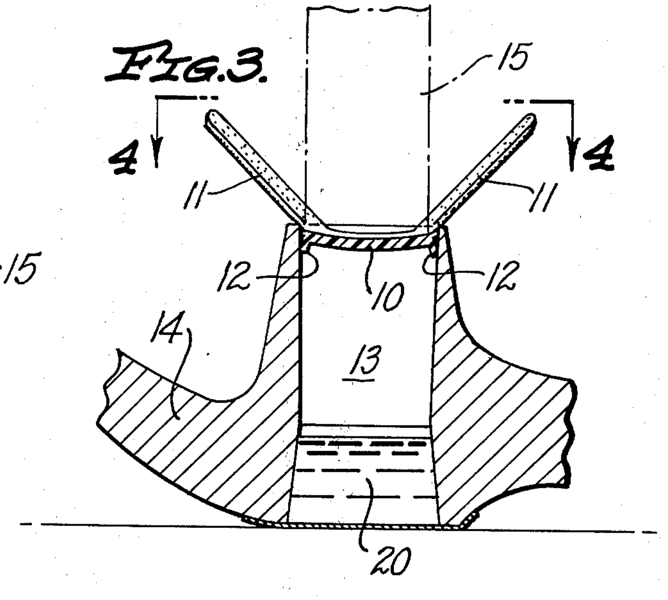
FIG. 3 is a sectional view of a tool head showing insertion of the handle and insert into the tool head opening.

A first embodiment which has been selected to illustrate the invention comprises an insert which may conveniently be molded and which is preferably formed of elastomeric material such as polyvinyl chloride or other material having suitable resilient properties.

The insert has a substantially rectangular center portion 10, which is flat on both sides. Extending radially and diagonally outwardly from the four corners of the center portion 10 are four elongated straight legs 11. The legs 11 are substantially equal in thickness to the center portion 10. One of the surfaces of the legs 11 is flat, while the other surface is rounded. The legs 11 are accordingly substantially semi-circular in cross-section.

A plurality of small integral spacers 12 are disposed around the center portion 10. In the embodiment shown, one spacer 12 is disposed adjacent to the midportion of each of the four sides of the center portion 10. The spacers 12 are substantially circular in cross-section. The spacers 12 are substantially thicker than the center section 10 and have ends which protrude somewhat beyond one surface of the center portion 10 to assist in the initial insertion and alignment of the center portion within the tool head eye opening.

Surrounding the center portion 10 are four relatively thin integral membranes 30. The membranes 30 extend around the entire periphery of the center portion 10 between the legs 11. In the embodiment shown in the drawings, the membranes 30 are offset from the center portion 10, being in alignment with what in use becomes the inner surface of the center portion 10. The membranes 30 are extremely flexible, the center portion 10 being several times greater in thickness than the membranes 30.

The structure shown in the drawings and described above is adapted for use in a tool head opening which is substantially rectangular in shape, with a substantially rectangular handle. Other tool head openings and handles may have other shapes and configurations and the shape and configuration of the insert may vary accordingly, so that the insert is complementary to the configuration of the tool head opening and handle with which it is used. The shape or configuration of the insert is not critical, so long as the proper result is achieved and the purpose of the insertion is served. This result and purpose are to hold the handle and tool head in correct immobile relationship to each other without the use of special tools during the time the potting compound is cured.

The center portion 10 is dimensioned peripherally to fit within the inner or narrower end of a handle receiving tool head opening 13 formed within a tool head 14. The sides of the spacers 12 preferably frictionally and resiliently engage the inner side walls of the opening 13. The spacers 12 are directed inwardly toward the opposite wider outer end of the opening 13.

In use, the end of a fiberglass tool handle 15 is inserted into the opening 13. The flat end of the handle 15 engages one side of the center portion 10 and moves the insert into the opening 13 as the handle 15 is inserted. As the insert moves into the opening 13, the four legs 11 are automatically bent inwardly to lie substantially flat against the corners of a handle 15 in parallel relationship to the handle.

At the same time, the membranes 30, which are relatively thin, are easily flexed in a reverse direction to the direction of movement of the insert. As the insert moves along the opening, the inner peripheral dimension of the opening gradually increases and the membranes 30 progressively flex outwardly by their own resilience. When the handle 15 is fully inserted, the membranes 30 extend outwardly across the entire area of the opening 13, covering the area between the edges of the center portion 10 and the opening 13.

The preferred method of assembly is to apply a piece of masking tape over the outer end of the opening 13 and then insert a charge of potting compound 20 into the opening 13. When the tool handle 15 is fully inserted into the opening 13, the ends of the spacers 12 are disposed either flush with or slightly below the edge of the tool head. The center portion 10 is covered by a thin layer of potting compound 20. If desired, a trademark or other indicia of a lighter color may be placed in overlying relationship to the center portion 10. It will then be visible through the thin layer of potting compound 20.

Figure 7:
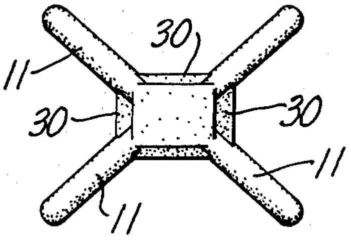
FIG. 7 is a top plan view of an alternative form of insert in which the spacers are eliminated.

FIG. 7 of the drawings shows an alternative embodiment of insert which is identical in its structure and operation, except that the spacers 12 have been eliminated.

Figure 4:
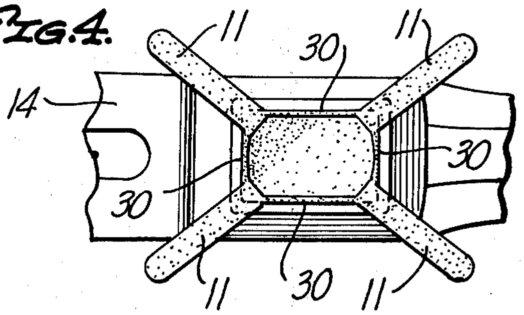
FIG. 4 is a transverse sectional view of the same taken on line 4—4 of FIG. 3.
Figure 5:
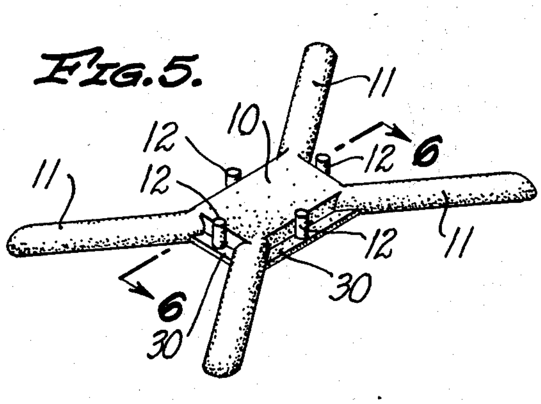
FIG. 5 is an isometric view of the insert.
Figure 6:
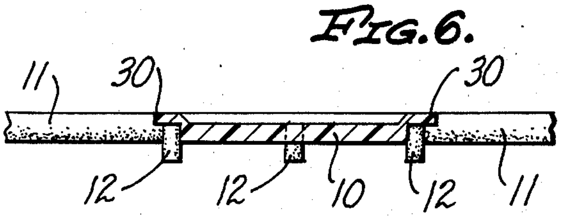
FIG. 6 is a sectional view of the same taken on line 6—6 of FIG. 5.

The cross-sectional configuration of the handle 15 is shown in FIG. 4 of the drawings. Its short sides are straight, while its long sides are slightly rounded. The corners may be beveled to make a better fit with the adjacent flat surfaces of the legs 11. The legs 11 fit snugly into the corners of the opening 13. In doing so, they act to prevent any movement of the handle in either lateral direction or any combination thereof such as diagonal movement or twisting.

It should be understood that the invention is not to be limited to such a corner arrangement exclusively and that other arrangements may be used. For example, the insert may be provided with integrally formed portions which extend between the sides of the handle and the sides of the inner walls of the tool head opening. The number of legs or similar members used may also be varied as desired from a minimum of one to a maximum of any feasible number.

The dimensions of the tool head opening in particular and sometimes those of the tool handle as well are customarily not held to close tolerances by the manufacturers. However, the flexible insert of the present invention is capable of compensating for all possible combinations of dimensional variations and tolerances of both the tool head opening and tool handle.

After the handle 15 has been fully inserted, all of the free spaces within the opening 13 are filled with potting compound. The tool then need not be placed in any special jig or holding device of any kind. It should preferably remain in a vertical position at least until the potting compound is no longer in liquid form. The insert, however, acts as all of the holding and positioning means required during curing of the potting compound.

It will be noted that the insert acts as an end plug as well as a holding insert. After the handle assembly is completed, the end of the opening 13 appears to be completely black and requires no painting or covering operation.

We claim:

1. An insert for use in attaching a tool handle of fiberglass or the like to a tool head having a handle receiving opening, said insert being adapted to hold said handle temporarily in a fixed position with respect to said tool head during the curing of potting compound within said opening which forms a permanent bond between said handle and tool head, said insert being formed of a single piece of molded resilient material, said insert comprising a flat solid center portion having a peripheral configuration substantially corresponding to the peripheral configuration of the head carrying end of said handle, and a plurality of legs each connected at one end thereof to said center portion, said legs extending radially outwardly from said center portion in the same plane as said center portion prior to insertion of said insert into said handle receiving opening, said insert being movable into said opening by the end of said handle when said handle is inserted into said opening, said legs engaging the inner walls of said opening and being bent at a right angle along the area of their connection to said center portion, so that said legs extend parallel to said handle between the inner side walls of said opening and the outer side walls of said handle, said legs resiliently engaging the adjacent sides of said handle and opening to hold said handle in position with respect to said tool head, said center portion having a flexible outwardly directed membrane extending around substantially its entire periphery, said membrane being formed integrally with said center portion and comprising a substantially thinner portion thereof, said membrane adapted to be flexed into a position wherein it extends substantially parallel to said handle when said handle and insert are inserted into said opening, said membrane being adapted to flex outwardly by its own resilience when said insert is disposed within the outer end of said opening, whereby said center portion and membrane combine to form a complete cover for the outer end of said opening.

2. The structure described in claim 1, said center portion being substantially rectangular and having said membrane extending outwardly from each of its four sides.

3. The structure described in claim 2, said insert having four legs extending from substantially the four corners of said center portion, said membranes extending between said legs.

4. The structure described in claim 2, said center portion having an integral spacer disposed adjacent to the midportion of each side thereof, said spacers protruding beyond said center portion and being adapted to engage the inside of the inner end of said opening.

* * * * *